United States Patent
Meagher et al.

(10) Patent No.: US 8,033,295 B2
(45) Date of Patent: Oct. 11, 2011

(54) MULTI-OUTPUT VALVE USEFUL TO PROMOTE NON-STATIONARY FLAME

(75) Inventors: James Patrick Meagher, Buffalo, NY (US); Mark Allen Kailburn, Tonawanda, NY (US); Willam Thoru Kobayashi, East Amherst, NY (US); Bryan R Bielec, Hamburg, NY (US); Friedrich Eduard Purkert, Buffalo, NY (US)

(73) Assignee: Praxair Technology, Inc., Danbury, CT (US)

( * ) Notice: Subject to any disclaimer, the term of this patent is extended or adjusted under 35 U.S.C. 154(b) by 916 days.

(21) Appl. No.: 12/028,416

(22) Filed: Feb. 8, 2008

(65) Prior Publication Data

US 2008/0191160 A1 Aug. 14, 2008

Related U.S. Application Data

(60) Provisional application No. 60/900,147, filed on Feb. 8, 2007.

(51) Int. Cl.
*F16K 11/08* (2006.01)
(52) U.S. Cl. .............................. 137/625.11; 137/625.46
(58) Field of Classification Search ............ 137/625.11, 137/625.46, 625.47; 251/310
See application file for complete search history.

(56) References Cited

U.S. PATENT DOCUMENTS

| 260,972 | A | * | 7/1882 | Goodrich | 251/310 |
|---|---|---|---|---|---|
| 1,529,529 | A | * | 3/1925 | Wojahn | 137/625.41 |
| 2,830,564 | A | | 4/1958 | Bryant | |
| 3,192,954 | A | * | 7/1965 | Gerhold et al. | 137/625.11 |
| 3,233,630 | A | * | 2/1966 | Strand | 137/625.17 |
| 3,636,981 | A | | 1/1972 | Henry | |
| 3,773,078 | A | * | 11/1973 | Suntheimer | 137/625.11 |
| 3,814,129 | A | * | 6/1974 | Cioffi | 137/625.11 |
| 3,912,161 | A | | 10/1975 | Harding et al. | |
| 4,146,055 | A | * | 3/1979 | Ryder et al. | 137/625.41 |
| 4,986,307 | A | * | 1/1991 | Hardee | 137/625.19 |
| 5,105,851 | A | * | 4/1992 | Fogelman | 137/625.11 |
| 5,554,022 | A | | 9/1996 | Nabors, Jr. et. | |
| 5,617,815 | A | | 4/1997 | Spies et al. | |
| 5,848,611 | A | * | 12/1998 | Stanevich | 137/625.47 |
| 6,196,266 | B1 | | 3/2001 | Breda | |
| 6,539,899 | B1 | | 4/2003 | Piccirilli et al. | |
| 6,904,936 | B2 | * | 6/2005 | Ma | 137/625.47 |
| 6,936,091 | B2 | | 8/2005 | Bayreuther | |
| 7,255,130 | B2 | * | 8/2007 | Martins et al. | 137/625.46 |
| 7,276,107 | B2 | | 10/2007 | Baksh et al. | |

FOREIGN PATENT DOCUMENTS

FR 2480897 10/1981

* cited by examiner

*Primary Examiner* — John Fox
(74) *Attorney, Agent, or Firm* — Donald T. Black

(57) ABSTRACT

A valve useful in distributing gas received in one inlet to several outlets in a sequence, and burner apparatus including this valve for feeding material in sequence to outlets of a burner thereby forming a non-stationary flame at the burner.

7 Claims, 8 Drawing Sheets

MULTI-OUTPUT VALVE USEFUL TO PROMOTE NON-STATIONARY FLAME

This application claims priority to U.S. Provisional Application Ser. No. 60/900,147, filed Feb. 8, 2007, the content of which is hereby incorporated herein by reference.

FIELD OF THE INVENTION

The present invention relates to apparatus and methods useful in carrying out combustion.

BACKGROUND OF THE INVENTION

Many industrial processes require subjecting material to elevated temperatures on the order of 1000° F. to 3000° F. Examples of such processes include melting aluminum and other metals, maintaining molten metal in the molten state, melting glassmaking materials, and maintaining glass in the molten state. To generate the required elevated temperature, processes requiring such elevated temperatures often combust carbonaceous fuel, in one or more burners each of which produces a flame situated close enough to the material that the heat of combustion establishes the desired elevated temperature in the material.

Typically the one or more burners used for this purpose each generate a flame that extends outward from the burner in a fixed position, such as extending from a side wall of a furnace across and over the top of a portion of the material to be heated. Such arrangements are not necessarily as efficient as possible, because the temperatures at various points around the outer surface of the flame and along the length of the flame are not uniform so that there is a region of the flame that has the highest temperature and heat flux to the material. This lack of uniformity means that the position of the burner relative to the material being heated, and the conditions under which the burner is operated, must be set so that the highest temperatures and heat flux generated by the burner are not so high as to produce unwanted results such as "hot spots" in the material or the enclosure in which the combustion is being carried out, excessive oxidation of the material, or damage to the enclosure. However, doing so often requires accepting temperatures at other points around the flame that are not as high as could be tolerated, and thereby requires accepting less than optimum performance of the burner.

This lack of efficiency has heretofore been considered acceptable for a number of reasons including the absence of a useful method and apparatus that can provide greater uniformity of temperature. The present invention provides apparatus and methods of use that overcome this lack of efficiency.

BRIEF SUMMARY OF THE INVENTION

The present invention provides a method and apparatus that are useful in permitting combustion to be carried out in a manner that affords a more uniform temperature of the surface of the material to be heated, or heated and melted.

One aspect of the present invention comprises a valve useful for feeding gas to one or more than one outlets at a total flow rate that is controlled independently of the number of such outlets, comprising a valve body having a valve chamber therein having opposed first and second ends and a side surface extending between said ends, the valve chamber including a first region that extends from the first end of the valve chamber and that has an axis, a valve distributor within the valve chamber and rotatable therein in said first region about said axis, the valve distributor having opposed first and second ends and a side surface between said ends, that is positioned with its first end facing the first end of the valve chamber and with its side surface facing at least a portion of the first region of the valve chamber, said valve chamber including an open space that is bounded by the second end of said valve distributor, the second end of the valve chamber, and the side surface of said valve chamber, the valve body having an inlet extending therethrough from the outer surface of said valve body to said open space, the valve distributor containing a channel extending inwardly from the side surface of the valve distributor and extending from the second end of the valve distributor axis at least a portion of the distance toward the first end of the valve distributor, to receive gas from said open space, the valve body having two or more outlets extending therethrough from the outer surface of said valve body to points in the first region of the valve chamber that face the side surface of the valve distributor or at least a portion of said channel, wherein the outlets are dimensioned and located with respect to each other so that at any rotational orientation of the valve distributor the channel is open to one outlet or to more than one outlet, and so that when the channel is open to more than one outlet at the same time the sum of the interfacial areas at said outlets stays within 90%, preferably within 50%, above or below the maximum interfacial area when the channel is open to only one outlet, and wherein the space between the side surface of the valve distributor and the side surface of the valve chamber, and the space between the first end of the valve distributor and the first end of the valve chamber, are small enough that when gas is fed into said inlet the amount that flows through said spaces to an outlet that is not open to the channel is less than the amount of gas that flows through the channel to the outlet or outlets to which at least a portion of the channel is open.

In a preferred embodiment of this valve, the valve distributor further comprises a first spindle that extends axially from said first end into the first end of said valve chamber, and a second spindle that extends axially from said second end into the second end of said valve chamber without occupying all of said open space, and wherein said valve body contains bearings on which said first and second spindles are rotatable about said axis.

In a further preferred embodiment of this valve, a passageway is provided within said valve distributor such that one end of the passageway opens to said channel and another end of the passageway opens to a point located on the side surface of the valve distributor that cannot be open to an outlet that is at the same time open to at least a portion of the channel. This passageway may further comprise a flow control that can be adjusted to control the amount of gas that can flow through the passageway.

Another aspect of the present invention is burner apparatus comprising (A) a central feed port having an axis;

(B) first supply apparatus for injecting a first stream comprising material selected from the group consisting of fuel, oxidant, and mixtures thereof, through the central feed port along the axis of the central feed port;

(C) three or more outer ports, each having an axis which converges or diverges with respect to the axis of the central feed port; and (D) three or more branched or unbranched supply lines, equal in number to the number of outer ports, wherein one end of each of said supply lines is connected to a different one of said supply ports and the other end of each of said supply lines is connected to a controllable supply apparatus for sequentially injecting material selected from the group consisting of fuel, oxidant, inert material, and mixtures thereof, into and through different ones of said supply lines whereby said material is sequentially ejected from different ones of said outer ports as a sequence of second streams having a momentum sufficient to deflect the first stream from the axis of said central feed port;

wherein said controllable supply apparatus comprises (E) a valve that comprises a valve body having a valve chamber therein having opposed first and second ends and a side surface extending between said ends, the valve chamber including a first region that extends from the first end of the valve chamber and that has an axis, a valve distributor within the valve chamber and rotatable therein in said first region about said axis, the valve distributor having opposed first and second ends and a side surface between said ends, that is positioned with its first end facing the first end of the valve chamber and with its side surface facing at least a portion of the first region of the valve chamber, said valve chamber including an open space that is bounded by the second end of said valve distributor, the second end of the valve chamber, and the side surface of said valve chamber, the valve body having an inlet extending therethrough from the outer surface of said valve body to said open space, the valve distributor containing a channel extending inwardly from the side surface of the valve distributor and extending from the second end of the valve distributor at least a portion of the distance toward the first end of the valve distributor, to receive gas from said open space, the valve body having two or more outlets extending therethrough from the outer surface of said valve body to points in the first region of the valve chamber that face the side surface of the valve distributor or at least a portion of said channel, wherein the outlets are dimensioned and located with respect to each other so that at any rotational orientation of the valve distributor the channel is open to one outlet or to more than one outlet, and so that when the channel is open to more than one outlet at the same time the sum of the interfacial areas at said outlets stays within 90%, and preferably 50%, above or below the maximum interfacial area when the channel is open to only one outlet, and wherein the space between the side surface of the valve distributor and the side surface of the valve chamber, and the space between the first end of the valve distributor and the first end of the valve chamber, are small enough that when gas is fed into said inlet the amount that flows through said spaces to an outlet that is not open to the channel is less than the amount of gas that flows through the channel to the outlet or outlets to which at least a portion of the channel is open, and (F) a controller for turning said valve distributor about its axis so that said channel is sequentially open to different ones of said outlets so as to sequentially provide said material from said open space through said channel to said outlets.

A preferred embodiment of the burner apparatus of the present invention comprises (A) a central feed port having an axis;

(B) three or more outer ports, each having an axis which converges or diverges with respect to the axis of the central feed port;

(C) one or more auxiliary feed ports situated closer to the central feed port than any of said outer ports are;

(D) first supply apparatus for injecting a first stream comprising material selected from the group consisting of fuel, oxidant, and mixtures thereof, through the central feed port along the axis of said central feed port;

(E) auxiliary stream supply apparatus for injecting an auxiliary stream comprising material selected from the group consisting of fuel, oxidant, and mixtures thereof, through said auxiliary feed ports non-sequentially; provided that at least one of said first stream and said auxiliary stream comprises fuel and at least one of said first stream and said auxiliary stream comprises oxidant, and (F) three or more branched or unbranched supply lines, equal in number to the number of outer ports, wherein one end of each of said supply lines is connected to a different one of said supply ports and the other end of each of said supply lines is connected to a controllable supply apparatus for sequentially injecting material selected from the group consisting of fuel, oxidant, inert material, and mixtures thereof, into and through different ones of said supply lines whereby said material is sequentially ejected from different ones of said outer ports as a sequence of second streams having a momentum sufficient to deflect the first stream from the axis of said central feed port, wherein said controllable supply apparatus comprises (G) a valve that comprises a valve body having a valve chamber therein having opposed first and second ends and a side surface extending between said ends, the valve chamber including a first region that extends from the first end of the valve chamber and that has an axis, a valve distributor within the valve chamber and rotatable therein in said first region about said axis, the valve distributor having opposed first and second ends and a side surface between said ends, that is positioned with its first end facing the first end of the valve chamber and with its side surface facing at least a portion of the first region of the valve chamber, said valve chamber including an open space that is bounded by the second end of said valve distributor, the second end of the valve chamber, and the side surface of said valve chamber, the valve body having an inlet extending therethrough from the outer surface of said valve body to said open space, the valve distributor containing a channel extending inwardly from the side surface of the valve distributor and extending from the second end of the valve distributor at least a portion of the distance toward the first end of the valve distributor, to receive gas from said open space, the valve body having two or more outlets extending therethrough from the outer surface of said valve body to points in the first region of the valve chamber that face the side surface of the valve distributor or at least a portion of said channel, wherein the outlets are dimensioned and located with respect to each other so that at any rotational orientation of the valve distributor the channel is open to one outlet or to more than one outlet, and so that when the channel is open to more than one outlet at the same time the sum of the interfacial areas at said outlets stays within 90%, preferably 50%, above or below the maximum interfacial area when the channel is open to only one outlet, and wherein the space between the side surface of the valve distributor and the side surface of the valve chamber, and the space between the first end of the valve distributor and the first end of the valve chamber, are small enough that when gas is fed into said inlet the amount that flows through said spaces to an outlet that is not open to the channel is less than the amount of gas that flows through the channel to the outlet or outlets to which at least a portion of the channel is open, and (H) a controller for turning said valve distributor about its axis so that said channel is sequentially open to different ones of said outlets so as to sequentially provide said material from said open space through said channel to said outlets.

Another aspect of the present invention is a combustion method comprising (A) injecting a first stream comprising material selected from the group consisting of fuel, oxidant, and mixtures thereof, through a central feed port that has an axis, along the axis of said central feed port;

(B) providing three or more outer ports each having an axis which converges or diverges with respect to the axis of the central feed port;

(C) providing three or more branched or unbranched supply lines, equal in number to the number of outer ports, wherein one end of each of said supply lines is connected to a different one of said supply ports and the other end of each of said supply lines is connected to a controllable supply apparatus for sequentially injecting material selected from the group consisting of fuel, oxidant, inert material, and mixtures thereof, into and through different ones of said supply lines, (D) sequentially injecting said material into different ones of said supply lines and thereby sequentially ejecting said material through different ones of one or more of said outer ports as a sequence of second streams having sufficient momentum to deflect said injected first stream from the axis of said central feed port and to form a mixture with the deflected first stream, and (E) combusting the mixture of first and second streams, wherein said controllable supply apparatus comprises (F) a valve that comprises a valve body having a valve chamber therein having opposed first and second ends and a side surface extending between said ends, the valve chamber including a first region that extends from the first end of the valve chamber and that has an axis, a valve distributor within the valve chamber and rotatable therein in said first region about said axis, the valve distributor having opposed first and second ends and a side surface between said ends, that is positioned with its first end facing the first end of the valve chamber and with its side surface facing at least a portion of the first region of the valve chamber, said valve chamber including an open space that is bounded by the second end of said valve distributor, the second end of the valve chamber, and the side surface of said valve chamber, the valve body having an inlet extending therethrough from the outer surface of said valve body to said open space, the valve distributor containing a channel extending inwardly from the side surface of the valve distributor and extending from the second end of the valve distributor at least a portion of the distance toward the first end of the valve distributor, to receive gas from said open space, the valve body having two or more outlets extending therethrough from the outer surface of said valve body to points in the first region of the valve chamber that face the side surface of the valve distributor or at least a portion of said channel, wherein the outlets are dimensioned and located with respect to each other so that at any rotational orientation of the valve distributor the channel is open to one outlet or to more than one outlet, and so that when the channel is open to more than one outlet at the same time the sum of the interfacial areas at said outlets stays within 90%, preferably 50%, above or below the maximum interfacial area when the channel is open to only one outlet, and wherein the space between the side surface of the valve distributor and the side surface of the valve chamber, and the space between the first end of the valve distributor and the first end of the valve chamber, are small enough that when gas is fed into said inlet the amount that flows through said spaces to an outlet that is not open to the channel is less than the amount of gas that flows through the channel to the outlet or outlets to which at least a portion of the channel is open, and (G) a controller for turning said valve distributor about its axis so that said channel is sequentially open to different ones of said outlets so as to sequentially provide said material from said open space through said channel to said outlets.

A preferred embodiment of the method of the present invention comprises (A) injecting a first stream comprising material selected from the group consisting of fuel, oxidant, and mixtures thereof, through a central feed port that has an axis, along the axis of said central feed port;

(B) providing three or more outer ports each having an axis which converges or diverges with respect to the axis of the central feed port;

(C) providing one or more auxiliary feed ports situated closer to the central feed port than any of said outer ports are;

(D) injecting an auxiliary stream comprising material selected from the group consisting of fuel, oxidant, and mixtures thereof, through said auxiliary feed ports non-sequentially; provided that at least one of said first stream and said auxiliary stream comprises fuel and at least one of said first stream and said auxiliary stream comprises oxidant, (E) providing three or more unbranched supply lines, equal in number to the number of outer ports, wherein one end of each of said supply lines is connected to a different one of said supply ports and the other end of each of said supply lines is connected to a controllable supply apparatus for sequentially injecting material selected from the group consisting of fuel, oxidant, inert material, and mixtures thereof, into and through different ones of said supply lines, (F) sequentially injecting said material into different ones of said supply lines and thereby sequentially ejecting said material through different ones of one or more of said outer ports as a sequence of second streams having sufficient momentum to deflect said injected first stream from the axis of said central feed port and to form a mixture with the deflected first stream, and (G) combusting the mixture of first and second streams, wherein said controllable supply apparatus comprises (H) a valve that comprises a valve body having a valve chamber therein having opposed first and second ends and a side surface extending between said ends, the valve chamber including a first region that extends from the first end of the valve chamber and that has an axis, a valve distributor within the valve chamber and rotatable therein in said first region about said axis, the valve distributor having opposed first and second ends and a side surface between said ends, that is positioned with its first end facing the first end of the valve chamber and with its side surface facing at least a portion of the first region of the valve chamber, said valve chamber including an open space that is bounded by the second end of said valve distributor, the second end of the valve chamber, and the side surface of said valve chamber, the valve body having an inlet extending therethrough from the outer surface of said valve body to said open space, the valve distributor containing a channel extending inwardly from the side surface of the valve distributor and extending from the second end of the valve distributor at least a portion of the distance toward the first end of the valve distributor, to receive gas from said open space, the valve body having two or more outlets extending therethrough from the outer surface of said valve body to points in the first region of the valve chamber that face the side surface of the valve distributor or at least a portion of said channel, wherein the outlets are dimensioned and located with respect to each other so that at any rotational orientation of the valve distributor the channel is open to one outlet or to more than one outlet, and so that when the channel is open to more than one outlet at the same time the sum of the interfacial areas at said outlets stays within 90%, preferably 50%, above or below the maximum interfacial area when the channel is open to only one outlet, and wherein the space between the side surface of the valve distributor and the side surface of the valve chamber, and the space between the first end of the valve distributor and the first end of the valve chamber, are small enough that when gas is fed into said inlet the amount that flows through said spaces to an outlet that is not open to the channel is less than the amount of gas that flows through the channel to the outlet or outlets to which at least a portion of the channel is open, and (I) a controller for turning said valve distributor about its axis so that said channel is sequentially open to different ones of said outlets so as to sequentially provide said material from said open space through said channel to said outlets.

Preferably, the first stream comprises material selected from the group consisting of fuel, oxidant, and mixtures thereof, and the second stream comprises material selected from the group consisting of fuel, oxidant, inert material, and mixtures thereof.

As used herein, the "axis" of a port is the centerline of the path that fluid injected out of that port follows in the absence of influence by intersecting fluid flows.

As used herein, material is "inert" if it does not participate in the combustion of fuel and oxidant, and a stream of material is "inert" if it does not contain material that participates in the combustion of fuel and oxidant.

As used herein, the channel and an outlet are "open" one to the other if gas can flow in a straight line through any part of the opening of the outlet into any part of the channel, without encountering solid structure.

As used herein, the "interfacial area" is the area of the portion (up to 100%) of an outlet's opening in the inner side surface of the valve chamber through which gas can flow radially outwardly out of the channel in the valve distributor. For instance, referring to FIGS. 11A and 11B (in which the outer opening of the channel is narrower than the opening of the outlet) and FIG. 11C (in which the outer opening of the channel is wider than the opening of the outlet), the interfacial areas are the areas of the shaded regions.

BRIEF DESCRIPTION OF THE DRAWINGS

FIG. 4 is a cross-sectional view of the embodiment of FIG. 1, seen from the side opposite the side from which FIG. 3 is seen.

DETAILED DESCRIPTION OF THE INVENTION

As indicated, one aspect of the present invention is the combination of the valve described herein with a burner that can generate a non-stationary flame.

The burner portion of the present invention is generally referred to as 20 in FIGS. 1-4. Burner 20 is preferably formed of refractory material that is capable of retaining its shape and composition when exposed to the temperatures of 1000° F. to 3000° F. to which the burner may be exposed. Examples of such materials include alumina, silica, AZS (alumina-zirconia-silica), mullite, zirconia, and zirconite. Burner 20 can be part of a roof, side wall or bottom of an enclosure such as a furnace in which the desired combustion is carried out.

Figure 1:
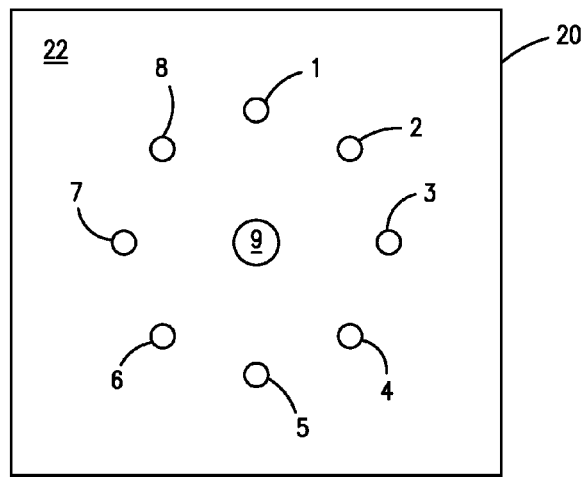
FIG. 1 is a front view of an embodiment of burner apparatus according to one aspect of the present invention.

Central feed port 9 and outer ports 1 through 8 open in the front 22 of burner 20. Central feed port 9 and the outer ports may be, but are not required to be, in the same plane, so long as the other characteristics described herein are observed. Central feed port 9 can comprise one opening as shown in FIG. 1, or can comprise two or more openings (preferably 1 to 8, more preferably 1 to 3) openings which should be located close to each other so that material ejected out the openings merges in the form of a flow of the ejected material having one axis 39 of flow. Examples include multiple single holes, or concentrically arranged annular openings.

While any number of outer ports greater than 2 outer ports may be present, more than about 30 outer ports are usually not necessary. Three to 20 outer ports are usually satisfactory, and preferably 6 to 12 outer ports may be provided. The distance from the central feed port 9 to each outer port can be the same, but this is not necessary. Instead, each outer port that is provided can be a different distance from central feed port 9, or some outer ports can be one given distance from central feed port 9 while another group of outer ports can be a second given distance from port 9. That is, the outer ports can be arrayed in the form of one circle around port 9, as shown in FIG. 1, or they may be arrayed in the form of two circles of different diameters, or they may be arrayed in the form of an ellipse, or two ellipses, or a rectangle, or two rectangles, and so forth.

The surface that contains the ports can be planar (flat) or concave or convex, preferably planar (flat) or concave. For concave and convex cases, the surface on which the ports lie can be spherical, ellipsoidal or a polyhedron shape.

Every outer port has an axis, and the axis of every outer port converges or diverges with respect to the axis 39 of the central feed port 9. As used herein, the axis of an outer port "converges" with respect to the axis of the central feed port if those two axes intersect downstream of front 22, and the axis of an outer port "diverges" with respect to the axis of the central feed port if those two axes intersect upstream of front 22, that is, inside or behind burner 20. Preferably, the axes of all outer ports all converge, or the axes of all outer ports all diverge, with respect to the axis of the central feed port. More preferably, the axes of all outer ports all converge with respect to the axis of the central feed port.

The angle at which the axis of each outer port converges or diverges with respect to the axis of the central fuel port is typically 5 to 85 degrees and preferably 10 to 75 degrees. Outer port axes that converge with respect to the central fuel port axis can be parallel to each other, or converge toward each other, or converge toward the same point on the central feed port axis. The outer port axes do not necessarily have to converge toward the same point: for instance, if the intent is to promote a moving flame that moves half way on an elliptical contour and half way on a circular contour, the axes of the outer ports would not converge toward the same point on the central feed port axis.

Figure 2:
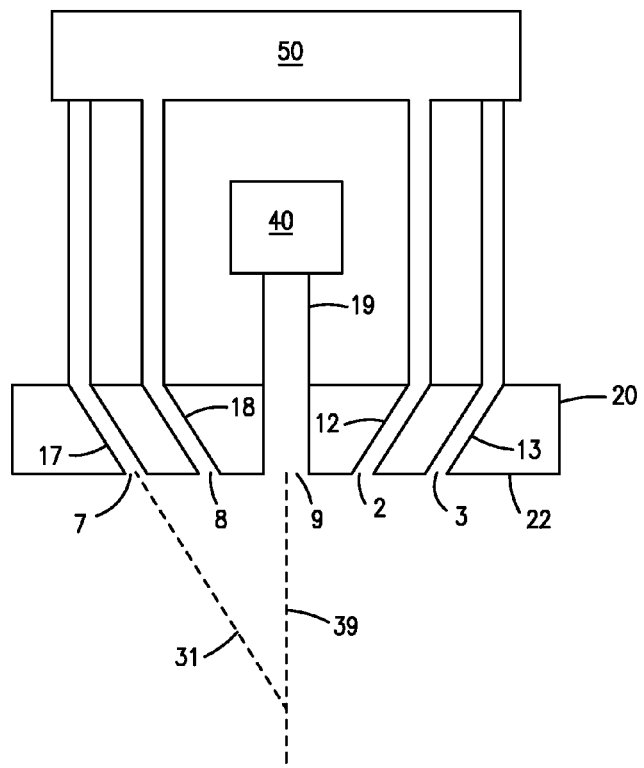
FIG. 2 is a cross-sectional view of the embodiment of FIG. 1, seen from above.
Figure 3:
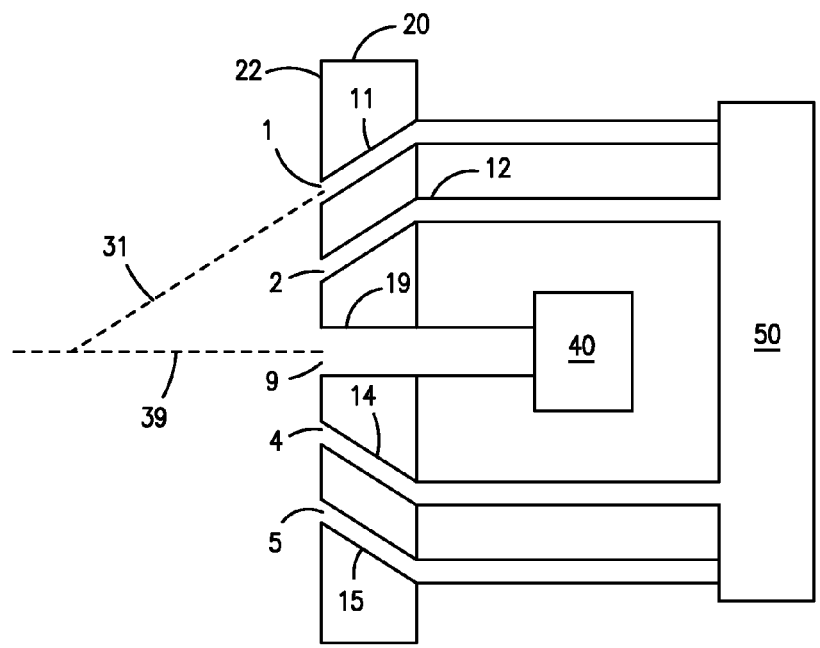
FIG. 3 is a cross-sectional view of the embodiment of FIG. 1, seen from the side.
Figure 4:
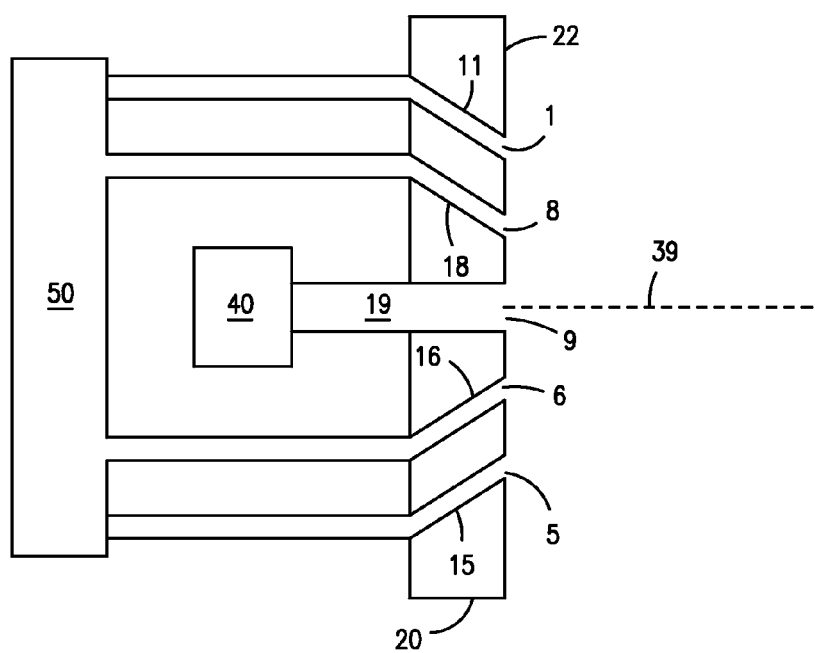

Referring to FIGS. 2, 3 and 4, central feed port 9 is connected by supply line 19 through burner 20 to first supply apparatus, schematically represented as 40, which provides and injects the material forming the first stream into supply line 19 so that it is ejected out through central feed port 9. Supply line 19 and central feed port 9 are aligned so that the first stream ejected out of port 9 follows axis 39. Preferably, axis 39 of port 9 is perpendicular to surface 22.

Each outer port is connected by its own corresponding separate supply line through burner 20 to supply apparatus, schematically represented as 50, which provides and injects material into each supply line so that the material is ejected as second streams out of the outer ports in the manner described herein.

Each supply line is branched or unbranched and connects supply apparatus 50 at one of its ends to its own outer port at its other end. Unbranched supply lines are preferred as they provide the advantages of no diversion of material into branch lines or through valves controlling access to branch lines. Using outer ports fed by unbranched supply lines enables more reliable and reproducible control of the flame pattern in the manner described herein.

In FIGS. 2, 3 and 4, not all passages connecting to outer ports are shown, for ease of reference and disclosure. As shown in FIG. 2, outer ports 2 and 3 are fed by supply lines 12 and 13, respectively, and outer ports 7 and 8 are fed by supply lines 17 and 18, respectively. Supply line 1 that feeds outer port 1 is not shown in FIG. 2, so that supply line 19 can be shown, but supply line 11 is shown in FIGS. 3 and 4. As shown in FIG. 3, outer ports 1 and 2 are fed by supply lines 11 and 12, respectively, and outer ports 7 and 8 are fed by supply lines 17 and 18, respectively. Supply line 13 feeding outer port 3 is not shown in FIG. 3 so that supply line 19 can be shown. As shown in FIG. 4, outer ports 1 and 8 are fed by supply lines 11 and 18, respectively, and outer ports 6 and 5 are fed by supply lines 16 and 15, respectively. Supply line 17 feeding outer port 7 is not shown in FIG. 4 so that supply line 19 can be shown.

The supply lines feeding to the outer ports can proceed straight through burner 20, as shown in FIGS. 1-4, but they can instead be constructed to include a first portion, ending at the outer port, whose axis is at a converging or diverging angle with respect to the axis of the central feed port, and to include a second portion intersecting with the first portion within burner 20 wherein the axis of the second portion is parallel to supply line 19 or is at some other angle with respect to the axis of the first portion.

The supply lines feeding the outer ports are preferably formed by drilling into the material from which the burner 20 is fabricated. Preferably, the supply lines feeding the outer ports and the supply line 19 feeding the central feed port are lined with protective material such as metal. The supply lines can also be created by casting a refractory block with large opening and inserting removable nozzles.

In an alternate embodiment, at the opening of some or all outer ports a nozzle or orifice can be provided through which the stream is ejected. In such cases, the axis of the nozzle or orifice is the axis of that outer port. The nozzles or orifices provided for this use may be adjustable so that the axis of each nozzle or orifice can be moved without having to replace or redrill the supply line that feeds to the outer port.

The material ejected as the first stream and the material ejected as the second stream must, after they have been mixed together, be capable of combusting in the presence of an external or embodied source of ignition or in a combustion chamber at temperatures higher than the self ignition temperature of fuel present in the mixture.

In one embodiment, the material ejected as the first stream and the material ejected as the second stream both comprise material which participates in combustion of the mixture that is formed of the first and second streams. For instance, the first stream can comprise fuel, in which case the second stream comprises oxidant or a premixed mixture of fuel and oxidant. Instead, the first stream can comprise oxidant, in which case the second stream comprises fuel or a premixed mixture of fuel and oxidant. In another alternative, both of the first stream and the second stream comprise premixed mixtures of fuel and oxidant. Preferably, the first stream comprises fuel and the second stream comprises oxidant.

In another embodiment, the material ejected as the first stream comprises fuel or a mixture of fuel and oxidant, and the second stream is "inert", that is, it does not contain material which participates in combustion of the mixture that is formed of the first and second streams. Examples of such material that could be ejected as the second stream include nitrogen, argon, carbon dioxide, water (liquid or, preferably, vapor), helium, and mixtures thereof.

Suitable fuels include combustible hydrocarbons whether gaseous, liquid, or particulate solid in form. Suitable gaseous fuels include natural gas, vaporized LPG (liquefied petroleum gas), propane, butane, and gaseous mixtures that contain carbon monoxide, hydrogen, or both carbon monoxide and hydrogen, such as coke oven gas, blast furnace gas, electric arc furnace gas, and coal gas. Suitable liquid fuels include fuel oil and diesel oil. Liquid fuel should be atomized as it emerges from its port (whether the central feed port or outer ports). Suitable solid fuels include coal of any rank or mixtures of rank, and petroleum coke. When the fuel is solid, it should have been reduced in particle size so that it is capable of being fed out of the port with a suitable carrier gas such as transport air, as is used when feeding pulverized coal to the combustion chamber of a coal-fired electricity generating power plant.

The oxidant should be a stream that contains 5 vol. % to 100 vol. % oxygen, and preferably 10 vol. % to 100 vol. % oxygen. Air is a preferred oxidant, as is oxygen-enriched air by which is meant air to which oxygen has been added to raise the oxygen content above that of air to e.g. at least 20 vol. % or 25 vol. % or even at least 50 vol. %. Another preferred oxidant is a gaseous stream containing at least 80 vol. % oxygen or even at least 95 vol. % or even at least 98 vol. % oxygen. Oxidant having this higher oxygen content can be provided from storage tanks that contain compressed oxygen gas, from storage tanks that contain liquid oxygen and provide the oxygen by vaporization of suitable amounts of the liquid oxygen, or from on-site air separation units that produce high-purity oxygen from air, or from an oxygen pipeline. Other gaseous components (such as the aforementioned materials that do not participate in combustion) can likewise be provided from storage tanks, supply trucks, or pipelines The supply apparatus 40 that injects into supply line 19 the material that is ejected from port 9 as the first stream, and the supply apparatus 50 that injects into the supply lines the material that is ejected from the outer ports as the second streams, include a suitable source of fuel, or oxidant, or premixed fuel and oxidant, or non-combusting material, as the case may be, as well as suitable apparatus for propelling the material to and through its port(s). Suitable devices for gaseous material include fans and blowers. Suitable devices for liquids and particulate solids include atomizers and blowers having the ability to perform the necessary function of delivering the material to and through the port(s) with the desired velocity. The additional capabilities of supply apparatus 50 are described below.

The velocity of the first stream ejected by the central feed port should typically be 5 to 1600 feet per second, and preferably 10 to 900 feet per second. The velocity of the second stream ejected by each outer ports should typically be 5 to 2000 feet per second and preferably 10 to 900 feet per second.

The temperature of the mixture of the first and second streams should typically be up to 3000° F., and preferably up to 2000° F.

In accordance with the present invention, in sequence (1) a second stream is ejected from one outer port, or from a group of adjacently located outer ports, with sufficient momentum to deflect the ejected first stream from the axis along which it would otherwise be traveling in the absence of that deflection, while at that same point in time material is either not being ejected from other outer ports, or is being ejected from other outer ports but not with enough momentum to deflect the first stream from its axis, and then (2) a second stream is ejected from a different outer port, or from a different group of adjacently located outer ports, with sufficient momentum to deflect the first stream (in a direction different from the direction it was previously deflected) from the axis along which it would otherwise be traveling in the absence of that deflection, while at that same point in time material is either not being ejected from other outer ports, or is being ejected from other outer ports but not with enough momentum to deflect the first stream from its axis, following which the ejection of second streams continues from a periodically changing outer port or group of outer ports. It should be noted that the flow of second streams of material that deflect the flow from the central feed port can occasionally be reduced, or interrupted, so that the ejected first stream of material flows along the axis of the central feed port temporarily, following which a second stream is again ejected from an outer port or group of outer ports to again deflect the first stream.

To carry out this function, supply apparatus 50 that injects material into the supply lines for ejection from the respective outer ports as the second streams includes mechanism for sequentially varying the supply line or lines into which the material is injected, with a high enough velocity, to sequentially vary the outer port or ports through which the second stream is ejected at any point in time with a momentum high enough to deflect the first stream being ejected from the central feed port from its axis.

The preferred mode of sequentially controlling the flow of material comprising the second stream through the outer ports employs a single-valve mechanism, situated between the individual supply lines and an upstream common source of supply of the second stream material, that includes a movable piece such as a rotatable diverter. The movable piece contains a principal opening through which the second stream material can flow into an outer port supply line with which the principal opening is aligned at any particular point in time. The movable piece otherwise blocks flow to the other outer port supply lines, or optionally also includes additional openings which are aligned with one or more of the other outer port supply lines when the principal opening is aligned with one of the outer port supply lines. The movable piece and the outer port supply lines are positioned with respect to each other so that the movable piece can be moved (for instance, rotated around its own axis) so as to bring outer port supply lines into alignment with the principal opening in a sequence that enables the material comprising the second stream to flow to a sequence of outer ports. When the material comprising the second stream is applied under pressure upstream of the movable piece, rotation of the movable piece aligns the principal opening with a sequence of outer port supply lines while permitting the second stream to flow into no other outer port supply lines, or in lesser quantities into other outer port supply lines, depending on whether any of the aforesaid additional openings are provided.

Preferred embodiments of this mechanism are described herein, with reference to FIGS. 7, 8, 9, 10A, 10B, 11A, 11B and 11C.

Figure 7:
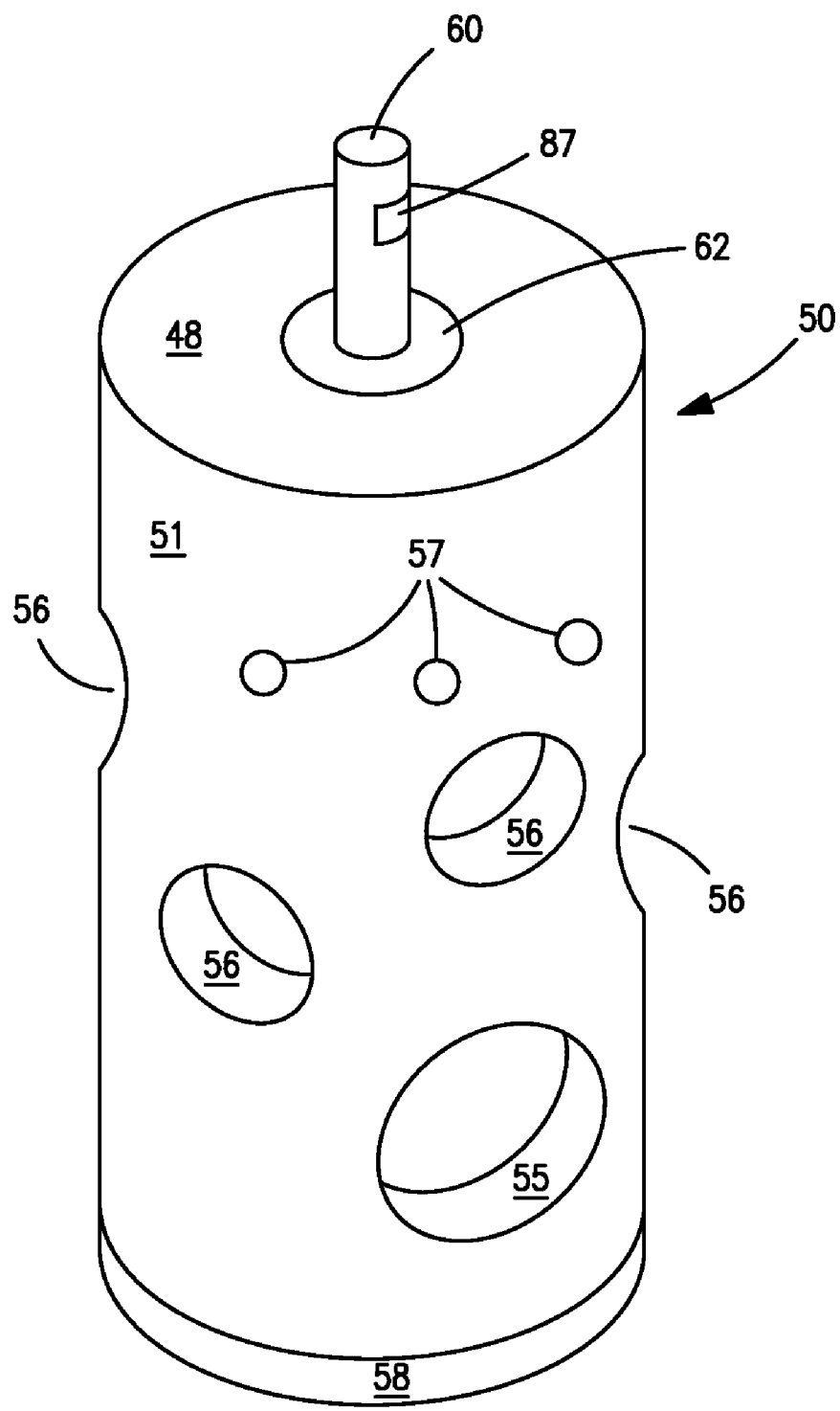
FIG. 7 is a perspective view of the exterior of a valve according to the present invention.

Referring to FIG. 7, valve 50 includes valve body 48 which has an outer surface 51 through which pass inlet 55; outlets 56, and optional but preferred seal leakage vents 57. Bottom plate 58, top bearing seal 62 and first spindle 60 are also shown. The first spindle 60 can include flat region 87 to facilitate attaching apparatus (a motor, or gears which are attached to a motor) which controllably rotates the spindle and the valve distributor 82. The valve body 48 is preferably made of metal such as steel or brass.

Figure 8:
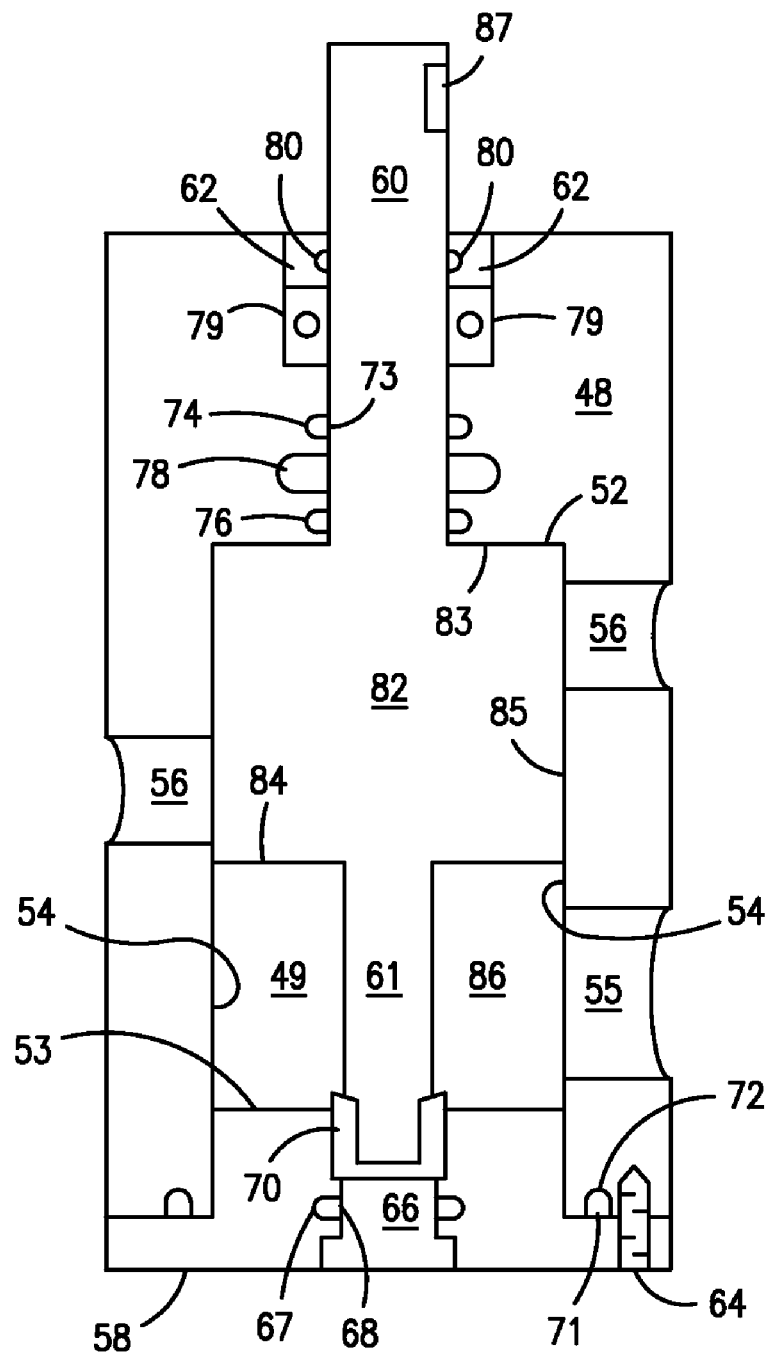
FIG. 8 is a cross-sectional view of a valve according to the present invention.

FIG. 8 shows the interior of the valve, including inlet 55, two outlets 56, bottom plate 58, top bearing seal 62, and first spindle 60, which appear in FIG. 7. Valve body 48 houses valve chamber 49 which has first end 52, second end 53, and wall surface 54. Surface 54 is shown as being cylindrical for at least the portion of the chamber 49 within which valve distributor 82 rotates. However, this portion of surface 54 can instead have a different shape, such as conical (converging upwardly toward a point or diverging upwardly), or other shape within which the valve distributor can rotate. Also shown in FIG. 8 are second spindle 61, one countersunk screw 64 of several that would hold bottom plate 58 to valve body 48, access plug 66 for accessing and replacing bottom bearing 70, access plug o-ring seal 67 and its groove 68, bottom bearing 70, bottom plate o-ring seal 71 and its groove 72, top o-ring seal 73 and its groove 74, seal leakage deflection collar 76, seal leakage expansion chamber 78 (which connects by ducts, not shown, to vents 57); top bearings 79 (preferably an angular contact rolling element pair for thrust and radial loads), and bearing retaining clip 80. Valve distributor 82 has first end 83, second end 84, and outer surface 85. Space 86, not fully occupied by valve distributor 82, is within valve chamber 49 in the region into which inlet 55 feeds gas. Second spindle 61 is optional but preferred, to provide stability for the rotating valve distributor.

Figure 9:
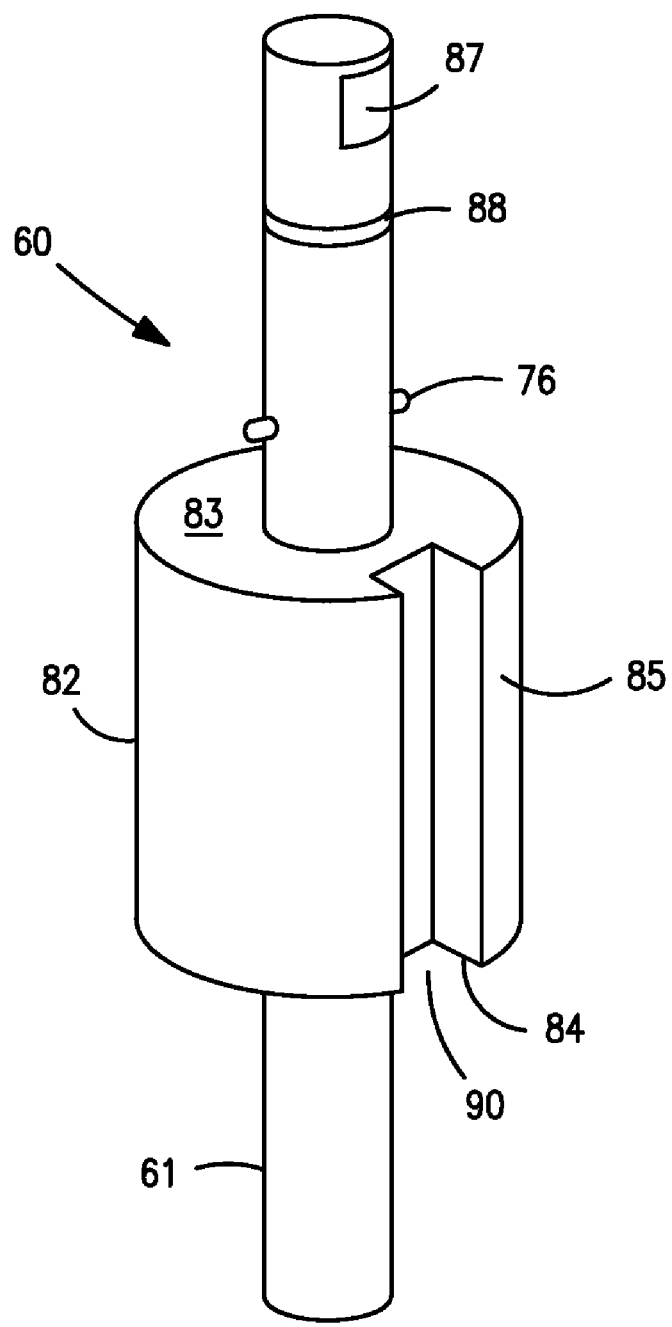
FIG. 9 is a perspective view of a valve distributor useful in the present invention.

FIG. 9 shows valve distributor 82, first spindle 60, second spindle 61, and first end 83, flat region 87, groove 88 for retaining clip 80, and seal leakage deflection collar 76. Valve distributor 82 is shown as being cylindrical in shape but it can instead have another shape such as conical (converging upwardly toward a point or diverging upwardly) which corresponds closely to the space closer to the first end 52 of valve chamber 49. Also shown is channel 90, which is open at outer surface 85 of valve distributor 82 and extends inwardly into valve distributor 82. Channel 90 is open at second end 84 and extends upwardly from second end 84 at least partway toward first end 83, far enough so that it can be open to the outlets 56 as valve distributor 82 rotates. Channel 90 is shown as extending upwardly from end 84 in a direction parallel to the axis of rotation. Channel 90 can instead have a different path, such as helical, along surface 85.

Valve distributor 82 fits closely within valve chamber 49 but space can be provided between the side wall surfaces 85 and 54 of valve distributor 82 and valve chamber 49, and between the first ends 83 and 52 of valve distributor 82 and valve chamber 49, so that a minor amount of gas can flow from space 86 through that space to reach every outlet, even outlets that are not at the moment open to the channel 90. Providing some gas to each outlet at all times is preferred as it provides some cooling to the openings at the front of the burner.

As indicated above, the space between the side surface 85 of valve distributor 82 and the side surface 54 of valve chamber 49, and the space between the first end 83 of valve distributor 82 and the first end 52 of valve chamber 49, are small enough that when gas is fed into said inlet the amount that flows through said spaces to an outlet that is not open to the channel 90 is less than the amount of gas that flows through the channel 90 to the outlet or outlets to which at least a portion of the channel 90 is open. Preferably, the spaces are small enough that even less gas can pass therethrough, that is, the amount that flows through said spaces to an outlet that is not open to the channel 90 is not more than 25%, more preferably not more than 10%, and even more preferably not more than 5%, of the amount of gas that flows through the channel 90 to the outlet or outlets to which at least a portion of the channel 90 is open.

Figure 10A:
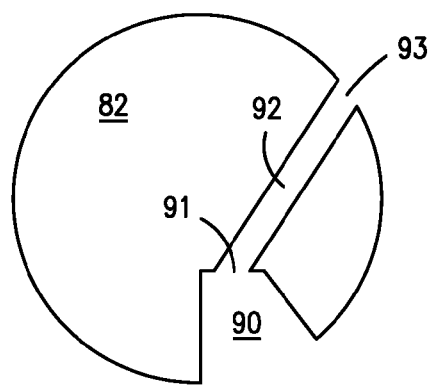
FIGS. 10A and 10B are respectively top and side cross-sectional views of another embodiment of a valve distributor useful in the present invention.
Figure 10B:
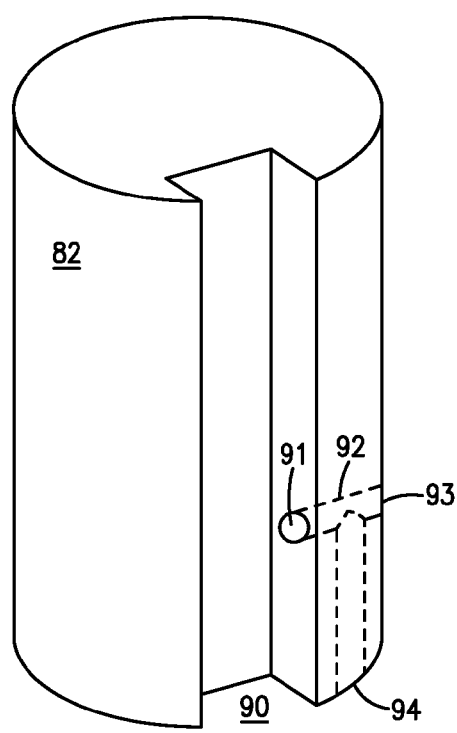
Figure 11A:
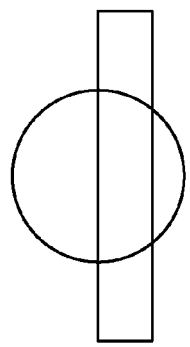
FIGS. 11A, 11B and 11C are plan views of the opening of an outlet seen from within a channel.
Figure 11B:
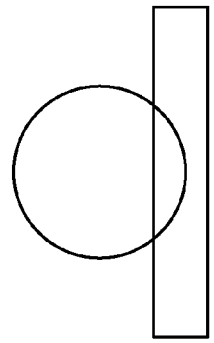
Figure 11C:
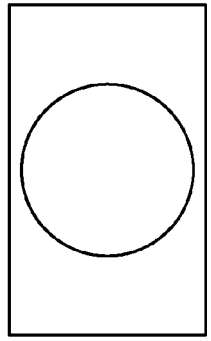

FIGS. 10A and 10B illustrate another, optional, manner in which gas can be provided to outlets. Passageway 92 is provided through valve distributor 82, from an opening 91 in channel 90 (whether in the bottom of channel 90, as shown in FIG. 10A, or in one of the walls of channel 90, as shown in FIG. 10B) to an opening 93 in the side surface of valve distributor 82. In a preferred version of this embodiment, adjustable screw 94 is provided whose tip extends to or into passageway 92. By turning the screw to adjust how much of the tip extends into passageway 92, or to move the tip out of passageway 92, one can vary the amount of gas that flows through and out of passageway 92. In the embodiment of the valve illustrated in FIGS. 7 and 8, the adjustment screw 94 could be accessed by removing bottom plate 58.

The outlets 56 can be arrayed in any of a number of ways around the valve body 48, but certain arrangements are preferred. The outlets are preferably placed on two or more levels, to allow closer packing of the outlets so that a smaller valve may be used (for ease of manufacture, handling and economy). The limit of the port packing tightness is based on at least two constraints. The first is in good practice for the attachment of conduits to the outlet conduits, so that the fastening of any one of the outlet conduits will not interfere with the fastening of the other outlet conduits. This applies to threaded connections where either the high points of the hose end connecting adapter would interfere or where turning of the wrench itself would be overly obstructed. It also applies in cases where other means of attachment are used such as welding or quick-disconnects. Another consideration in the tightness of the packing of the outlets is in the allowable stresses of the material remaining between the ports given the internal pressure, any bending moments induced by the weight of attached hoses, and induced stress from the method of attachment whether it be threaded, welded, flanged or quick disconnects.

Another preferred mode is that the outlets are sized identically and distributed evenly. It should be noted that while relatively constant flow through the various outlets may be desired in some applications of this invention, it is not required in others. Thus, the descriptions herein of how to make a valve according to this invention need not be limited to embodiments that provide such relatively constant flows.

Figure 12A:
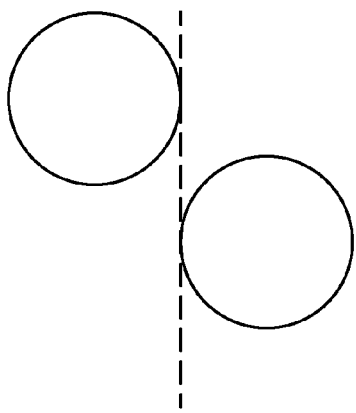
FIGS. 12A and 12B are plan views of representative arrangements of openings of outlets that are adjacent to each other.

In addition, a preferred distribution of the outlet ports is such that a single line drawn vertically tangent with the interior edge of one of the outlets either does not intersect the adjacent outlet, or is a tangent line for the interior edge of the adjacent outlet. This relationship is illustrated in FIG. 12A. For instance, for a six port valve in this mode of arranging the outlets, there are six evenly spaced, imaginary, vertical lines each of which is simultaneously tangent to two adjacent outlets. At the same time, channel 90 is sized so that at the surface 85 of valve distributor 82 it is the same nominal width as the diameters of the outlets at the wall surface 54. This arrangement enables maintaining a constant primary outlet flow area no matter the position of channel 90. That is, as valve distributor 82 rotates and the interfacial area with one outlet decreases, the edge of the adjacent outlet port begins to be open and the interfacial area with that next outlet increases by a corresponding amount so that the same total outlet area is exposed to the flowing gas.

Figure 12B:
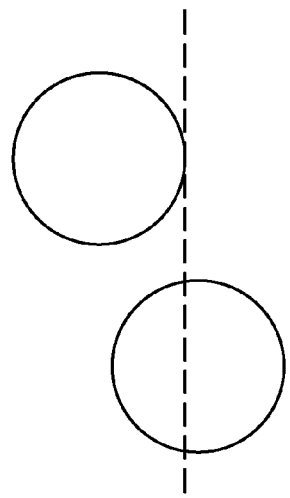

The outlets can instead be spaced more closely, so that a vertical line on surface 54 can pass through two or more outlets. However, it is still preferred that even if the outlets are spaced so that a vertical line that is tangent to one outlet opening can pass through the opening of the closest adjacent outlet, the outlets should still be spaced apart from one another enough so that a vertical diameter of one outlet's opening does not intersect the opening of any of the closest adjacent outlets. This relationship is illustrated in FIG. 12B.

The spacing of the outlets achieves the aforementioned preference that at any rotational orientation of the valve distributor the channel is open to one outlet or to more than one outlet, and that when the channel is open to more than one outlet at the same time the sum of the interfacial areas at said outlets stays within 90% above or below the maximum interfacial area when the channel is open to only one outlet. Preferably, the sum of the interfacial areas at said outlets stays within 50% or 25%, more preferably within 10%, and even more preferably within 5%, above or below the maximum interfacial area when the channel is open to only one outlet.

Sizing of the valve is based upon the amount of flow required through the connections and the number of connections needed. Generally the connections are sized to keep the pressure drop reasonable and economical and this is done with a flow velocity less than sonic velocity and generally between 10 and 300 ft/s. The size of the valve body is then based upon the diameter and height required to distribute the number and size of connections around the periphery while maintaining a suitably sturdy device (by not allowing the distance between openings to be so narrow that the material cannot carry the loads required) and considering that the valve distributor must be able to transition from outlet to outlet without significantly altering the flow. The channel 90 itself is sized to maintain the velocity less than sonic velocity and generally between 10 and 600 ft/s for a reasonable and economical pressure drop. Materials of construction are selected based on whether materials will be in contact with the process fluid.

In operation, gas (preferably, the oxidant rather than fuel, though it can ge gaseous fuel) is fed into inlet 55 from a source (not shown) such as a pump or a tank in which the gas is stored under pressure. The source should have controls such as an adjustable valve that enables the flow of gas to be shut off, turned on, and varied in flow rate. The gas enters into space 86 and passes into channel 90 and then to various outlets 56 as the valve distributor 82 rotates under the action of a motor that can be controlled so that the operator can vary or set the rate at which the valve distributor is rotated, and preferably the length of time that the valve distributor rests in each position it takes that aligns channel 90 with one or more outlets. The controller preferably also controls the sequence of outlets at which the channel 90 is aligned.

The valve described herein can be electronically or pneumatically controlled. With electronic control, a variable frequency driver would drive an electric motor which turns the rotary valve, and the rotational speed would be controlled by a PLC. Alternatively, the valve can be rotated by a stepper motor that is executing a program stored in a motor control unit. To control a pneumatically operated rotary valve, the supply pressure of the compressed driving fluid would be varied and controlled.

Using either of these control schemes or any other control scheme that achieves the same function, the second stream is provided in sequence through an outer port or to a group of adjacent outer ports at a momentum sufficient to deflect the first stream from its axis. The sequential feeding of second streams having that momentum sequentially changes the outer port or outer ports which is or are ejecting the second streams that deflects the first stream, which in turn sequentially changes the direction in which the first stream is deflected. The sequence of first stream-deflecting flows of second streams preferably proceeds around and around the array of outer ports, from one outer port and then from its nearest neighbor and then from that outer port's nearest neighbor and so forth, such as out of outer ports 1 through 8 in the numerical sequence in which they are numbered in FIG. 1, with flow out of outer port 8 being followed by flow out of outer port 1, and so on. Alternatively, the sequence of outer ports from which first stream-deflecting flows of second streams are ejected can skip from one outer port to another non-adjacent outer port, then to another that is adjacent or non-adjacent, and so forth. Furthermore, the sequence can be repetitive, or it can be randomized so that there is no regularity to which outer port will be the next to eject a second stream to deflect the flow of the first stream. The sequence, whether regular or randomized, can be programmed into and carried out by the PLC.

Typically, the direction of flow of the first stream-deflecting flow of the second stream changes often enough that a complete sequence of direction changes occurs in 0.03 to 30 minutes, preferably 0.1 to 10 minutes.

While the present invention can be carried out by ejecting first stream-deflecting flows of material as the second stream from one outer port at a time, it is also possible and often is preferred to eject the second streams from a pair of adjacent outer ports at a time, or from a group of three outer ports comprising a middle port and an adjacent port on each side of the middle port. That is, referring to FIG. 1, the second stream that deflects the first stream can come from any one of outer ports 1 through 8, or from two adjacent ports at a time such as from ports 1 and 2, then from ports 2 and 3, then from ports 3 and 4, and so forth. Alternatively, the flows can come from ports 1, 2 and 3, then from ports 2, 3 and 4, then from ports 3, 4 and 5, and so forth. Indeed, the number of outer ports from which a second stream is directed to deflect the first stream can be from only 1 up to 1 less than the total number of outer ports, and preferably from 1 to 4 outer ports.

The ratio of the momentum of the stream ejected by the outer port or outer ports which deflect the first stream, to the momentum of the first stream from the central feed port, is typically 1.01 to 20 and preferably 1.1 to 10.

The exit openings of the ports can vary in shape (geometry) and area as long as the streams are ejected within an effective velocity range (which for the first stream ejected from the central feed port is a velocity typically between 5 to 1600 feet per second, and preferably 10 to 900 feet per second; and for the second stream ejected by outer ports is a velocity between 5 to 2000 feet per second, and preferably 10 to 900 feet per second).

The distance between the outer port to the center port can vary from outer port to outer port. Preferably, the outer ports should lie on a circular or elliptical pattern.

Of the total amount of material ejected as second stream through all outer ports at any point in time, typically 10 to 100% and preferably 50 to 100% of that amount should be ejected by the outer port or ports that are providing the momentum to deflect the first stream.

When the axes of the outer ports converge with respect to the axis of the central feed port, the first stream-deflecting second stream or streams deflects the first stream from its axis by "pushing" it from its axis. When the axes of the outer ports diverge with respect to the axis of the central feed port, the first stream-deflecting second stream or streams deflects the first stream from its axis by drawing or aspirating the first stream toward the second stream(s). In either situation, the second stream or streams intersects with and mixes with the first stream.

Once ignited, the mixture that forms of the first and second streams combusts and forms a flame. The direction in which the first stream is deflected (by the second stream or streams) becomes the direction in which the mixture of the first and second streams extends which in turn is the direction that the flame extends. Thus, the orientation of the flame with respect to the axis of the central feed port changes with each intersection between the first stream and a first stream-deflecting second stream coming from a different outer port or group of outer ports. For example, carrying out the present invention with a burner like that shown in FIGS. 1-4, and ejecting the second stream from the outer ports in the numerical sequence of ports 1 through 8 in that order, then as one looks at the front of the burner in the view provided in FIG. 1 the flame would be deflected so that the flame would obscure port 5, then port 6, then port 7, then port 8 (at which point the first stream-deflecting flow of second stream would be from port 4) and so forth as the flame would continue to appear to sweep out a cone whose vertex would be at port 9.

This behavior continually provides the desired heat of combustion to the material being heated and to the enclosure in which the combustion is occurring, but does so in a way that provides a more uniform temperature distribution because the continually shifting orientation of the flame avoids the creation of "hot spots" or regions which become overheated because of the uninterrupted proximity to the hottest regions of the flame. This in turn permits combustion conditions that provide a hotter average flame temperature, since there is less need to be constrained by avoidance of "hot spots".

The ratio (or proportion) of material in the first and second streams needs to be appropriate to maintaining combustion of the mixture that forms upon intersection and mixing of the first and second streams. Thus, for each mixture of fuel and oxidant that forms as the flame changes orientation by ejection of second stream from each sequentially differing outer port, taking into account oxidant entering the flame from the surroundings plus any oxidant fed through any auxiliary feed port(s) plus oxidant fed in the first and second streams, the ratio of the total amount of oxygen fed to the amount of fuel fed must be from 0.5 to 10 times the stoichiometric ratio, where the stoichiometric ratio is defined as the mole amount of oxygen per mole of fuel that is required to completely combust the fuel to $CO_2$ and $H_2O$. For instance, the stoichiometric ratio defined in this way for combustion of methane is 2, so the ratio of oxygen to methane to establish in each mixture of first and second combustant that is formed is 2×(0.5 to 10) or 1 to 20.

The distance between the axis of the central feed port and the nearest outer port is typically 3 to 24 inches and preferably 6 to 18 inches.

In addition to providing the advantage of a more uniform temperature profile of the surface of the material to be heated, or heated and melted, and for the resulting heating that the flame provides, the present invention is advantageous in that it can be carried out using staged combustion techniques that help reduce production of nitrogen oxides. Staging can be effected by permitting the injection of small amounts of material through the outer ports that are not involved at a given point of time in deflecting the first stream.

Figure 5:
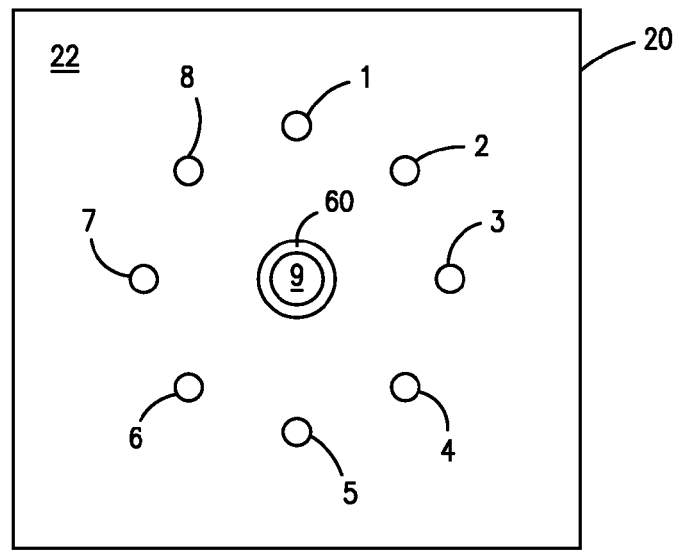
FIG. 5 is a front view of another embodiment of burner apparatus according to the present invention.
Figure 6:
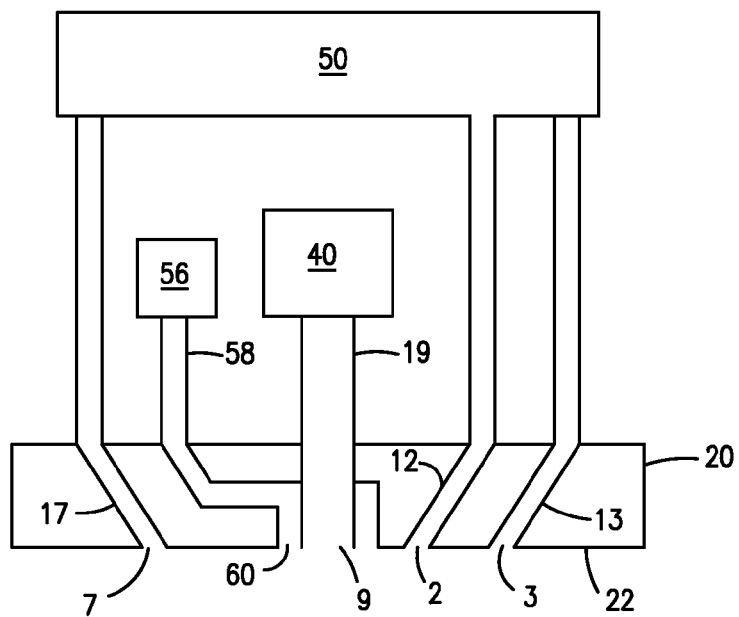
FIG. 6 is a cross-sectional view of the embodiment of FIG. 5, seen from above.

A preferred alternative embodiment, illustrated in FIGS. 5 and 6, includes one or more auxiliary feed ports through which a stream is ejected to help stabilize the flame and control formation of nitrogen oxides. A preferred auxiliary feed port is an annular orifice 60 around the central feed port 9. Instead, the annular orifice 60 can be replaced by a series of distinct openings arrayed around the central feed port 9. The one or more auxiliary feed ports are closer to the central feed port than any of the outer ports are. The auxiliary feed port or ports are fed through auxiliary supply line 58 from auxiliary feed source 56. In this embodiment, the stream ejected by the central feed port 9 comprises fuel, oxidant, or a mixture of fuel and oxidant, and the auxiliary feed port or ports 60 eject fuel, oxidant, or a mixture of fuel and oxidant, provided that at least one of the central feed port and the auxiliary feed port(s) ejects fuel and at least one of the central feed port and the auxiliary port(s) ejects oxidant. The material fed to the central feed port and the material fed to the auxiliary port(s) by their respective sources of supply 40 and 56 are provided and injected by means of apparatus known in this technical field.

The material fed to auxiliary feed port or ports 60 is fed non-sequentially, that is, the rate at which material is fed to and through the auxiliary feed port(s) does not vary during operation, and does not fluctuate between different rates during operation.

The invention provides many other advantages. One is that the present invention provides a flame with wide coverage to transfer heat more efficiently to the material being heated.

Also, flame direction can be changed easily, even during operation of the burner, without requiring any change to the hardware (burner and/or flow control valves), simply by changing the directions to the controller that governs the sequential feeding through the outer ports.

Another advantage is the ability to point the flame in a pre-determined direction for a pre-determined period of time. That is, the flame does not need to be moving constantly. The frequency of the changes of flame orientation, and the period of time the flame points in any given direction can be set, for instance, at the moment the furnace is charged and according to the way the furnace has been charged (for instance, the flame can stay pointed to a given direction where there is a greater amount of charged material to be heated, or where there is more freshly charged material that is initially at a lower temperature.

Additional benefits of the invention include:

Fewer "hot spots" are formed in the refractory wall, which can increase the furnace life.

Promoting more uniform heat transfer pattern means fewer "cold spots", which can lead to increased melt rate or heat rate.

Fewer burners are required due to the uniform heat transfer pattern, thus affording equivalent production for a lower investment.

A burner installed in the roof leaves more locations in the side wall to install peep holes, service doors, and charging doors.

A burner with moving flame installed in the roof allows the design of the combustion system to be optimized for the furnace geometry.

The direction of the flame and the intensity of the flame are determined by independent jets, i.e., do not rely on nozzle design, gas mixing, fluid flow pattern, and material reliability against degradation factors such as chemical attack or spalling, and is less sensitive to variations in operating parameters that would affect flame stability. The flame stability and characteristics are determined by fixed and robust gas injection ports. The greater uniformity of temperature avoids localized high temperature regions or spots since the heat is transferred evenly around the burner (or melting or heating surface) and not only on one stripe across the charge. The heat is evenly and gently distributed over the charge. This also permits a potentially lower oxidation rate when heating materials susceptible to oxidation due to localized high temperature and high oxygen partial pressure, such as aluminum and steel.

Other advantages include high flame stability and reduced downtime, because in the unlikely event of clogging of an outer port, the sequence of injection can be revised to avoid using that port until suitable repairs can be made.

The invention also provides economic advantages including low fabrication cost, yield improvement in applications where oxidation is a concern, such as aluminum melting and steel reheating, and low specific fuel consumption.

What is claimed is:

1. A valve useful for feeding gas to one or more than one outlets at a total flow rate that is controlled independently of the number of such outlets, comprising a valve body having a valve chamber therein having opposed first and second ends and a side surface extending between said ends, the valve chamber including a first region that extends from the first end of the valve chamber and that has an axis, a valve distributor within the valve chamber and rotatable therein in said first region about said axis, the valve distributor having opposed first and second ends and a side surface between said ends, that is positioned with its first end facing the first end of the valve chamber and with its side surface facing at least a portion of the first region of the valve chamber, said valve chamber including an open space that is bounded by the second end of said valve distributor, the second end of the valve chamber, and the side surface of said valve chamber, the valve body having an inlet extending therethrough from the outer surface of said valve body to said open space, the valve distributor containing a channel extending inwardly from the side surface of the valve distributor and extending from the second end of the valve distributor at least a portion of the distance toward the first end of the valve distributor, to receive gas from said open space, the valve body having two or more outlets extending therethrough from the outer surface of said valve body to points in the first region of the valve chamber that face the side surface of the valve distributor or at least a portion of said channel, wherein the outlets are dimensioned and located with respect to each other so that at any rotational orientation of the valve distributor the channel is open to one outlet or to more than one outlet, and so that when the channel is open to more than one outlet at the same time the sum of the interfacial areas at said outlets stays within 90% above or below the maximum interfacial area when the channel is open to only one outlet, and wherein the space between the side surface of the valve distributor and the side surface of the valve chamber, and the space between the first end of the valve distributor and the first end of the valve chamber, are small enough that when gas is fed into said inlet the amount that flows through said spaces to an outlet that is not open to the channel is less than the amount of gas that flows through the channel to the outlet or outlets to which at least a portion of the channel is open.

2. A valve according to claim 1 further comprising within said valve distributor a passageway one end of which opens to said channel and another end of which opens to a point located on the side surface of the valve distributor that cannot be open to an outlet that is at the same time open to at least a portion of the channel.

3. A valve according to claim 2 further comprising a flow control that can be adjusted to control the amount of gas that can flow through said passageway.

4. A valve according to claim 1 wherein the first region of said valve chamber and the valve body rotatable therein are cylindrical.

5. A valve according to claim 1 wherein the first region of said valve chamber and the valve body rotatable therein are conical.

6. A valve according to claim 1 wherein said channel extends from the second end of said valve distributor toward the first end of the valve distributor in a direction parallel to said axis.

7. A valve according to claim 1 wherein the outlets are dimensioned and located with respect to each other so that when the channel is open to more than one outlet at the same time the sum of the interfacial areas at said outlets stays within 50% above or below the maximum interfacial area when the channel is open to only one outlet.

* * * * *